March 22, 1966  R. R. GUIVER  3,242,318

DATA SENSING APPARATUS

Filed Sept. 6, 1960  2 Sheets-Sheet 1

INVENTOR
REGINALD RICHARD GUIVER

BY Hane and Nydick

ATTORNEYS

March 22, 1966 R. R. GUIVER 3,242,318
DATA SENSING APPARATUS
Filed Sept. 6, 1960 2 Sheets-Sheet 2
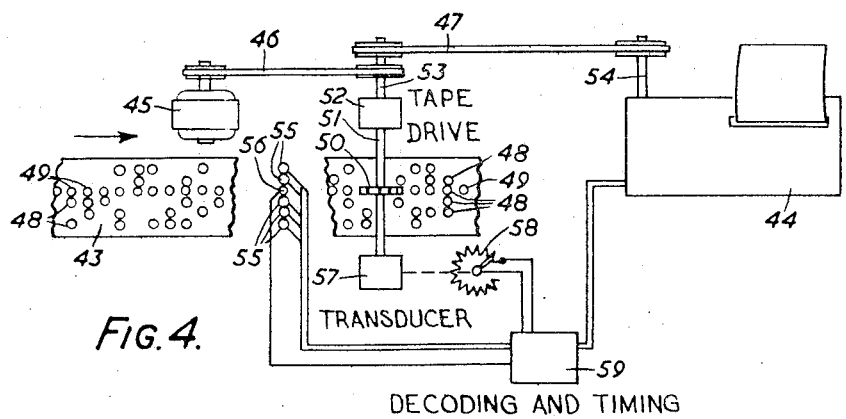
FIG. 4.
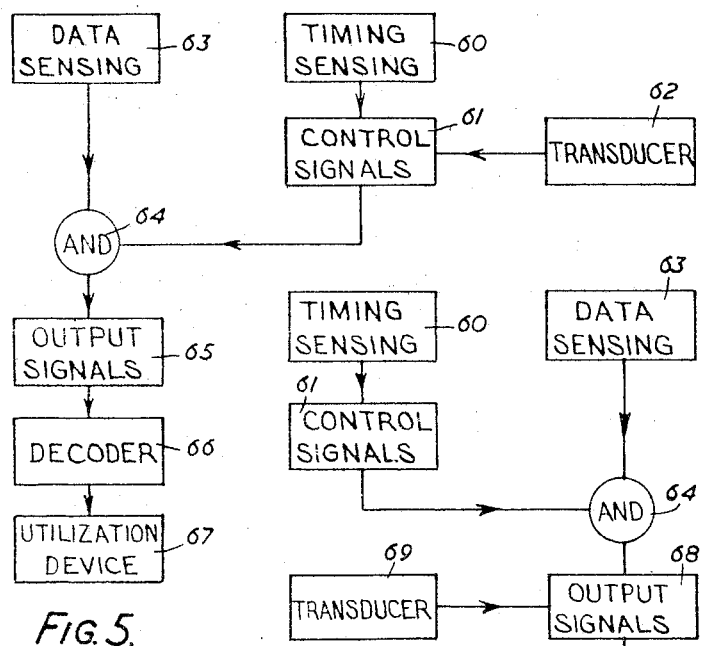
FIG. 5.
FIG. 6.
INVENTOR
REGINALD RICHARD GUIVER
BY Hane and Nydick
ATTORNEYS

United States Patent Office 3,242,318
Patented Mar. 22, 1966

3,242,318
DATA SENSING APPARATUS
Reginald Richard Guiver, Baldock, England, assignor to International Computers and Tabulators Limited, London, England
Filed Sept. 6, 1960, Ser. No. 53,993
Claims priority, application Great Britain, Sept. 18, 1959, 31,850/59
5 Claims. (Cl. 235—61.11)

The present invention relates to apparatus for sensing information recorded by means of data item representations on a record.

It is known to record information, such as statistical data, for example, by means of data item representations in predetermined positions on a record. Suitable records are, for example, record cards and sheets and paper or magnetic tapes. The representation of items of data for the recording of information may take various forms in dependence upon the nature of the record. For example, paper or card records may carry data item representations in the form of perforations or marks and records having a magnetisable surface may carry such representations in the form of discrete areas having predetermined magnetic characteristics.

In order to make use of information stored in this manner it is required to sense the record by means of a sensing device responsive to the particular form of representation used in recording the information. For example, marks may be sensed optically; perforations may be sensed optically or by an electrical sensing device and other forms of indicia may be sensed by appropriate transducing arrangements. The sensing of a representation is commonly required to provide an electrical signal to actuate a utilization device, which may be, for example, a printing apparatus, in order to re-record or otherwise use the information recovered by the sensing arrangement. For example the record may be fed past the sensing device and the electrical signal generated upon sensing a representation is timed in relation to the passage of the record past the sensing device is dependence upon the position on the record occupied by the sensed representation.

However, the operation of a utilization device in this way requires a finite period of time which is determined by the operating characteristics of the device and remains substantially constant irrespective of the speed of the feeding means. Where operation of the utilization device is directly responsive to the sensing of representations, it is common to drive the utilization device and the record feeding means in synchronism from a single driving motor, the timing of the feeding and sensing means being advanced with respect to that of the utilization device by an amount sufficient to allow time for the correct operation of the utilization device. It has been proposed to introduce the required advance in the drive to the feeding and sensing means by, for example, suitable displacement in the meshing of driving gears. However, the additional time obtained in this way is constant only when the speed of the drive, and consequently of feeding, is also constant and it is inherent in apparatus of this kind that this additional time decreases as the driving speed is increased.

Since the time required to ensure correct operation is a finite time it will be seen that there is an upper limit to the speed with which apparatus arranged in this way may be driven, beyond which insufficient time is allowed for correct operation of the utilization device.

According to one aspect of the present invention apparatus for sensing information recorded by means of data item representations in predetermined positions on a record, the apparatus being capable of operation at at least two different speeds includes means for sensing the data item representations, a position in which a representation may be recorded being presented to the sensing means during a sensing period, means responsive to the sensing of a representation for generating an output signal delayed with respect to the beginning of the sensing period by a time which may vary according to the speed of operation of the apparatus and means for further varying the delay time in dependence upon the speed of operation of the apparatus, the further variation introduced thereby being such that the delay time is smaller for a higher speed.

According to another aspect of the invention the apparatus is capable of operation over at least two different operating speed ranges and includes means for driving the apparatus at speeds within the said ranges, means for sensing data item representations, means driven by the driving means for feeding the record past the sensing means whereby a position in which a data item representation may be recorded passes the sensing means during a sensing period, means for generating an output signal in response to the sensing of a representation in a position, the output signal being delayed with respect to the beginning of the sensing period by a time which may vary inherently with the speed of the apparatus and means for further varying the delay time in response to a change in the speed range at which the apparatus is currently arranged to operate, the said further variation being such that the delay time is smaller for a higher speed range.

The output signal generating means may be operable to generate the output signal in response to a signal generated directly by the sensing means or may be arranged to generate the output signal in response to a control pulse passed by the sensing means when a representation is sensed. The means for further varying the delay time may be merely a means for selecting only a part of the signal applied to the output signal generating means in dependence upon the speed of operation of the apparatus or may be a device for similarly varying the timing of the generation of the control signal in those cases where control signals are used.

Apparatus embodying the present invention will now be described by way of example, with reference to the accompanying drawings, in which.

Figure 3:
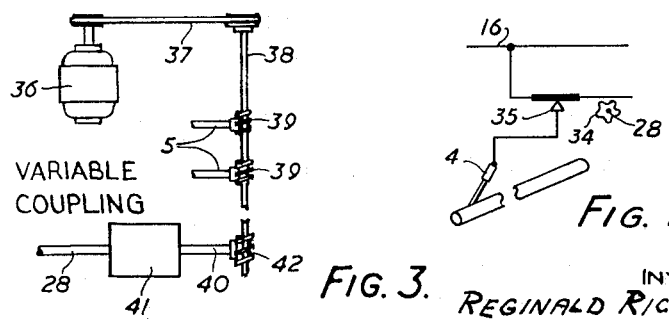

FIGURE 3 shows schematically a driving arrangement for a record card feeding and sensing apparatus, FIGURE 4 shows schematically apparatus for controlling a printing device from a record tape sensing and feeding apparatus, FIGURE 5 is a block schematic diagram of an arrangement for controlling a utilization device from a record feeding and sensing apparatus, and FIGURE 6 is a block schematic diagram of an alternative arrangement to that shown in FIGURE 5.

Figure 1:
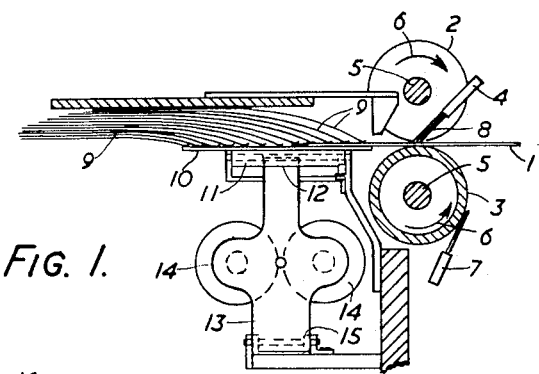
FIGURE 1 shows part of a record card feeding and sensing apparatus.

FIGURE 1 shows the arrangements for feeding and sensing record cards in a record card sorting machine of the kind described in United Kingdom patent specification No. 242,654. In this kind of apparatus information is recorded by representations consisting of perforations in predetermined positions in columns of a record card 1. The record card 1 is advanced by means of a pressure roller 2 cooperating with a contact roll 3 so that a column of the card passes beneath a sensing brush 4.

The pressure roller 2 and the contact roll 3 are rotated by means of shafts 5 in the directions of the arrows 6 and are arranged to grip the record card 1 so that it is advanced from right to left as shown in the figure. The card is fed so that the predetermined positions in a single column are scanned sequentially by the sensing brush 4.

A common brush 7 is mounted to make electrical contact with the contact roll 3 and as a perforation 8 in the card passes under the sensing brush 4, the brush 4 drops through the perforation 8 and also makes electrical contact with the roll 3. Thus, the sensing of a perforation 8 is signified by the provision of an electrical connection from the brush 4 to the brush 7 and the period during which this electrical contact may be made for any position in the card column may conveniently be termed the "sensing period."

The operation of sorting consists primarily in diverting the record card into one of the spaces between a series of overlying spring blades 9. The ends of the blades 9 are supported in line with the path of the record card 1 by means of a platform 10. The platform is, in turn, supported in this position by a block 11 cooperating with a latch face 12 formed on the armature 13 of an electromagnet assembly having magnet coils 14. The armature is pivoted at a point 15 remote from the latch face 12.

As a record card 1 is advanced through the apparatus its leading edge passes between the ends of the blades 9 and the platform 10. At the time when a perforation 8 is sensed the leading edge will have passed under a number of blades, the number being dependent upon the position of the perforation 8 in the column of the card 1. In the example shown in FIGURE 1 the card has passed under four of the blades 9. The sensing of a perforation 8 at this point causes energization of the magnet coils 14 and the armature 13 is in consequence attracted, thereby removing the latching face 12 from the block 11 and allowing the platform 10 to fall.

At this point the record card 1 continues to support those blades 9 under which it has passed, the remaining blades 9 falling with the platform 10. Thus, as card feeding continues, the leading edge of the record card 1 is unable to pass beneath the tips of the remaining blades 1 and is diverted into the space immediately below the last of the blades under which it has already passed. In the example shown the card 1 will be diverted into the space between the fourth and fifth blades 9 from the right hand side.

It will be appreciated that a finite time is required for the energization of the electromagnet coils 14 and for the movement of the platform 10 and the unsupported blades 9. Further, it is apparent that the time available for this operation is limited by the speed with which the card is fed, and it follows that for any combination of electromagnet and platform there is an upper limiting speed of feeding beyond which the apparatus cannot function correctly, i.e., mis-sorting occurs because the leading edge of the record card 1 is advanced under the end of the next blade 9 before the platform 10 moves.

If the speed of feeding is constant this condition may be avoided by arranging that the sensing of a perforation is advanced in the direction of card feeding, so that a perforation is sensed earlier than would otherwise be the case. This result may be simply achieved, for example, by moving the sensing brush 4 to the right as shown in FIGURE 1. Adjusting the brush 4 in this way allows greater time for the operation of the platform 10 and the amount of adjustment required is determined by the required feeding speed. However, during acceleration from rest, and also during deceleration, the speed of feeding is lower than that for which adjustment is made, with the result that mis-sorting may again occur, this time because the leading edge of the record card 1 has not reached the correct blade 9 before the platform 10 drops.

Figure 2:
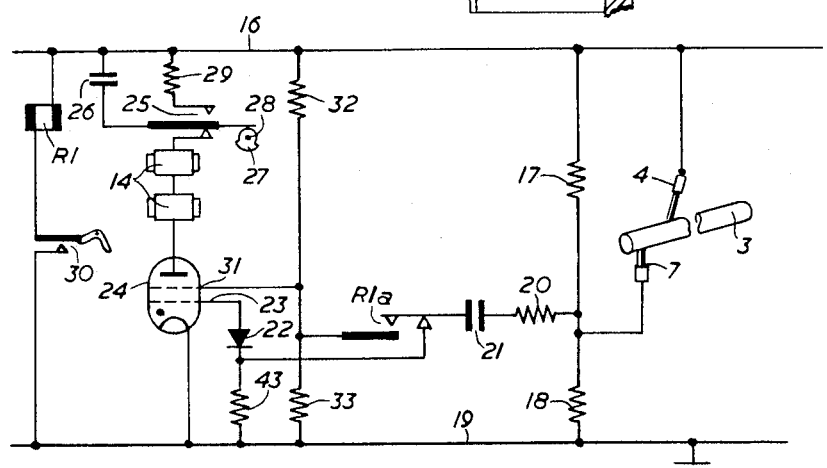
FIGURE 2 is a circuit diagram of record card sensing apparatus.

FIGURE 2 shows a circuit arrangement for the sorting apparatus of FIGURE 1 in which arrangements are provided for varying the timing of operation of the platform 10 relative to the time at which sensing takes place in dependence upon the speed of feeding. The sensing arrangements comprising the sensing brush 4, the contact roll 3 and the common brush 7 are connected in series between an H.T. supply line 16 and the junction of two resistors 17 and 18. The resistors 17 and 18 form a potential divider connected between the H.T. supply line 16 and an earth potential supply line 19. Hence, the sensing of a perforation 8 (FIGURE 1) produces a signal in the form of a positive electrical pulse at the junction of the resistors 17 and 18 (FIGURE 2). The timing of the positive-going leading edge of this signal is determined by the time at which the contact brush 4 first makes contact with the contact roll 3 and the negative-going trailing edge of the signal corresponds to the time at which the contact brush 4 is lifted away from the contact roll 3 by the trailing edge of the perforation 8 (FIGURE 1).

When the speed of feeding is low, relay contacts R1a (FIGURE 2) of a relay R1 are in the position shown. Under these conditions the signal applied to the junction of the resistors 17 and 18 are passed by a resistor 20 a capacitor 21, contacts R1a to the junction of a resistor 42 and a diode 22.

The signal is differentiated by the circuit formed by the capacitor 21 and the resistor 43 and the differentiated signal consisting of a positive-going impulse followed by a negative going impulse is applied to the diode 22. These two impulses are separated by a time interval determined by the effective length of the perforation in the record card, that is, a time equal to the duration of the sensing period.

The diode 22 is connected to one control electrode 23 of a gas filled relay valve 24 in such a way that the first, positive-going impulse is inhibited and the second, negative-going impulse is passed to the electrode 23 to trigger the valve 24. The valve 24 is used to generate an output signal to operate the sorting magnet in the following way.

The valve 24 is of a kind available commercially under the type number GN10 and is characterized in that it has two triggering electrodes and may be triggered by the application of a negative-going impulse to one of these electrodes or alternatively by the application of a positive-going impulse to the other. Hence, the electrode 23 is that which responds to the application of a negative-going impulse to trigger the valve.

The valve 24 conducts and current flows in the anode-cathode circuits. The anode circuit includes the electromagnet coils 14 (FIGURES 1 and 2), mechanically actuated contacts 25 and a capacitor 26. The flow of anode current charges the capacitor 26 and energizes the electromagnet coils 14 to initiate movement of the platform 10 (FIGURE 1). The mechanically actuated contacts 25 (FIGURE 2) are associated with a cam 27 mounted on a shaft 28 driven in synchronism with the shafts 5 of FIGURE 1 so that once during the feeding of every record card at a time after sensing has been completed, the contacts 25 (FIGURE 2) are momentarily shifted and a resistor 29 is connected across the capacitor 26 to discharge it in readiness for sensing the next card.

A centrifugal switch is provided in the drive to the apparatus and is arranged so that as a predetermined critical speed is reached during acceleration and deceleration a pair of contacts 30 are closed and opened respectively. Such switches are well known and suitable forms of construction are disclosed in, for example, U.S. Patent 2,493,897, issued January 10, 1950, to J. L. Petz et al., and British Patent 302,595, issued March 17, 1930, to The National Cash Register Company. Thus, during a transition from low to high speed contacts 30 are closed as the critical speed is passed. Closing of contacts 30 causes the relay R1 to operate and the contacts R1a to transfer. When the contacts R1a are transferred the signal appearing at the junction of resistors 17 and 18 as the result of sensing a perforation is connected through the resistor 20, capacitor 21, contacts R1a (transferred) to the junction of resistors 32 and 33. The second electrode 31 of the valve 24 is also connected to the junction of resistors 32 and 33 which together form a potential divider between the supply lines 16 and 19 to set the normal potential of the electrode 31 when the valve 24 is in a quiescent state.

The signal appearing at the junction of the resistors 17 and 18 is differentiated, under these conditions, by the circuit formed by the capacitor 21 and the resistor 33 with the result that the positive going leading impulse applied to electrode 31 now triggers the valve 24. Thereafter the operation of the plate 10 (FIGURE 1) in response to the energisation of electromagnet coils 14 (FIGURES 1 and 2) follows as described above.

Thus, during the acceleration of the apparatus from low speed to high speed, the release of the platform 10 by the electromagnet coils 14 is first initiated by an output electrical signal derived from the passage of the trailing edge of a perforation past the sensing means and once the critical speed has been passed the timing of the output pulse is varied so that it now corresponds to the leading edge of the perforation. This is equivalent to arranging that the sensing of a perforation is advanced by a distance equivalent to the length of the perforation when the critical speed is passed.

It will be appreciated that during deceleration the sensing of a perforation is effectively retarded by a corresponding amount by the de-energization of the relay R1 in response to the opening of the centrifugal contacts 30.

Hence, taking the beginning of the sensing period as a datum, during the operation of the apparatus at a constant speed below the critical speed, the output signal is delayed by a constant time. At a constant speed above the critical speed this delay is varied so that it is now effectively zero, and, by the suitable choice of the critical speed, this variation is such that correct operation of the apparatus is secured not only for the constant speeds referred to but also for the speed ranges below and above the critical speed respectively until a further maximum speed is reached.

It will be appreciated that when the apparatus is operated at varying speeds below the critical speed, for example, the exact delay time will depend upon the particular speed of operation. This is because the duration of the sensing period is shortened as the speed of operation is increased and this form of timing variation is inherent in apparatus arranged in this way. However, the variation introduced by the action of the centrifugal switch is additional to and independent of the inherent variation and it will be seen that this further variation of the timing of the output signal to the operating magnet coils ensures that correct operation of the apparatus is obtained over a wider range of feeding speeds than has been possible with an invariantly timed sensing arangement.

It will also be appreciated that the effective overall speed range at which correct operation is assured may be further extended by the provision of a number of triggering tubes and a corresponding number of switches. Under these conditions each successive speed range is controlled by the operation of a corresponding switch. The trigger tubes are all triggered of the same part of the signal passed by the sensing device and are selected in turn under control of the switches. Each tube has a delay circuit associated with its control electrode, and is triggered after a time dependent upon this delay circuit. The apparatus is then arranged so that with the maximum delay necessary, correct operation is secured for the lowest speed range. The highest permissible speed range is then that for which the delay is reduced to zero. Thus, the total amount by which the sensing may be effectively advanced under these conditions is equal to the maximum delay necessary at the lowest speed range.

It will be appreciated, however, that using the arrangement described with reference to FIGURE 1, the amount by which sensing is advanced corresponds to the sensing period which, in turn, is determined by the effective length of the perforation. However, since the perforations used in convention record cards are standardised it will be realised that it is inconvenient to modify the actual length of a perforation in order to obtain a required advance of sensing. Accordingly, the effective length of a perforation may be adjusted by modifying the sensing arrangements used.

For example, in the case of the brush sensing device described, this effective length may be increased by using a sensing brush 4 having a number of strands of wire forming a long face in the direction of card movement. The first strand to drop through a perforation determines the time at which the leading edge of the sensing signal occurs and the lifting out of the perforation of the last strand of the brush sets the time for the trailing edge of the signal. Thus, the distance between the first and last strands of the sensing brush 4 in the direction of card movement determines the amount by which the effective length of the perforation is increased.

The effective length of a perforation may be decreased by the use of control signals generated by a suitable form of pulse generator, such as a circuit breaker arrangement. For example, cam operated contacts may be provided and connected in series with the sensing brush. The contacts are arranged to close and reopen once for each position in which a perforation may occur, and the time for which the contacts are closed is shorter than the period during which the sensing brush makes contact with the common roll through a perforation when present. Hence, in this case the sensing means merely passes a control signal generated by the cam operated contacts for each perforation sensed.

The modification to the circuit of FIGURE 2 required in this case is shown in FIGURE 2a. Similar parts of FIGURES 2 and 2a are indicated by similar references and it will be seen that the modification replaces the direct connection from the H.T. supply line 16 to the sensing brush 4 by a circuit including timing contacts 35. In this modification a lobed cam 34 is provided on a shaft 28. The cam 34 has as many lobes as there are positions in a column of a card wherein perforations may occur. Contacts 35 are closed by the cam 34 once for each perforation position and are connected between the H.T. supply line and the sensing brush 4.

When a control signal generator, such as the cam 34 and contacts 35, is provided, an alternative means for adjusting the timing of the output signal from the sensing means may be used. In this case the sensing apparatus may be simplified, the electromagnets 14 which control the movement of the patform 10 may be connected directly between the sensing device common brush 7 and the earth potential supply line 19. Thus, a signal generated by the control signal generator is passed as an output signal directly to the electromagnets 14 whenever a perforation is sensed. Variation of the timing of this output signal is then accomplished by varying the timing of generation of control signals in relation to the sensing periods during which item representation-carrying positions pass the sensing device. This variation may be produced mechanically and FIGURE 3 shows an example of driving arrangement suitable for use in apparatus of this kind.

In this example, an electric motor 36 is coupled by means of a belt 37 to a main driving shaft 38. The record feeding means is driven by means of the shafts 5 which are coupled by worm gearing 39 to the main shaft 38. The shaft 28 (FIGURES 2 and 3) which carries the impulse generator cam 34 (FIGURE 2) is driven by a shaft 40 (FIGURE 3) through a variable coupling 41, and the shaft 40 is, in turn, driven by worm gearing 42 from the main shaft 38. The variable coupling 41 consists of a speed sensitive element similar to a conventional speed governor which is arranged to vary the coupling between the shafts 28 and 40. This variation consists of an angular displacement of the shaft 28 about its axis relative to the shaft 40, so that as the speed of the shaft 40 increases the angular displacement of the shaft 28 advances the timing of pulses generated by the pulse generator relative to the feeding of record cards under control of the shafts 5. This, in turn, advances the timing of the output signal relative to the beginning of the sensing period. Such couplings for varying the relative angular displacement between coupled shafts are well known and one form of coupling is shown and described on pages 256–7 of "Automobile Electrical Equipment" (6th edition) by A. P. Young and L. Griffiths, published in Great Britain by Iliffe & Sons Ltd., and in U.S.A. by Chilton Company (Book Division).

Variation of the timing of the output signal in this way has the advantage that the required variation takes place smoothly as the speed of feeding is varied and not in steps as in the case of the timing variation described with reference to FIGURE 2.

It will be appreciated that the smooth adjustment of timing in response to variation in feeding speed may be alternatively accomplished by means of circuitry rather than by direct mechanical coupling. For example, suppose that the means for sensing a perforation consists of a sensing brush and a common roll, similar, to the brush 4 and the roll 3 previously described, and that a signal resulting from the sensing of a perforation is applied to the control electrode of an electronic valve, the output signal being derived from the anode of the valve. In this case, the output signal may be made to lag the signal applied to the control electrode by means of a time delay circuit incorporated in the control electrode circuit. A suitable delay circuit for this purpose consists of a variable resistor and a capacitor connected to the control electrode, the delay being the time required to charge the capacitor, for example. The value of the resistor then sets the charging time and hence the delay. Thus, it follows that the delay time may be varied by suitably varying the value of the resistor. Under these circumstances a speed sensitive device, similar to that in the variable coupling 41 of FIGURE 3, may be coupled to a transducer to control the variation of the value of the resistor. Other electronic delay circuits may alternatively be used in a similar manner, for example an inductive delay circuit may be used by suitably varying the value of the inductance in response to operation of the speed sensitive device.

An apparatus using a transducer in this way is shown schematically in FIGURE 4 and consists of an arrangement for sensing data item representations from a paper tape 43 in order to control the printing of the data items by a printing device 44.

The paper tape is of a kind conventionally used in the telegraph art and each data item may be represented in coded form by one or more of five holes 48 disposed in a line across the tape. Each line in which a group of item representing holes may be recorded therefore corresponds to a position in which a data item may be recorded as described with reference to FIGURE 1. A further hole 49 is provided in association with each of these positions and this hole is used in conjunction with a sprocket wheel 50 to feed the tape. The sprocket 50 is driven by a shaft 51 through suitable gearing 52 from a shaft 53. The shaft 53 is, in turn, driven by a belt 46 from a motor 45. A further belt 47 also couples the shaft 53 to the drive shaft 54 of the printing device 44.

The sprocket 50 feeds the tape past a sensing station having a group of five photoelectric cells 55 arranged to sense the holes in each position in turn. A further cell 56 is associated with the sprocket holes 49 and is thus used to generate a control signal as each position passes the sensing cells 55. Since the sprocket holes 49 are smaller than the item representing holes 48, the control signals are of shorter duration than the signals generated by the photoelectric cells 55. The sprocket holes 49 therefore fulfill the dual role of providing means for feeding the tape and of providing timing representations which are separately sensed by the cell 56.

The shaft 51 is further coupled to a speed sensitive device 57 similar to the device 41 of FIGURE 2 which is arranged to produce a mechanical movement proportional to variations in the driving speed of the apparatus. This mechanical movement is coupled to a transducer 58 which is a variable resistor arranged so that its resistance changes in proportion to the movement.

The data item representations are sensed by the photoelectric cells 55 and resultant signals are passed to a decoding and timing control circuit 59, where they are decoded before being passed to operate the printing device 44. The device 44 is electromagnetically operated and therefore requires a finite time to perform each printing operation, hence as the speed of the apparatus is increased it is required to advance the effective time of output signals delivered to it in order to ensure its correct operation in the manner previously described.

It will be appreciated that the requisite variation in the timing of the output signals may be effected either by directly varying the timing of the generation of the output signals or by effectively varying the timing of the data representing signals before they are applied to the output signal generating circuits. FIGURES 5 and 6 show schematic block diagrams illustrative of these two conditions.

Referring now to FIGURE 5, the timing representations are sensed by a sensing device 60 and are passed to a control signal generator 61. A transducer 62, such as the transducer 58 of FIGURE 4, is provided to vary the timing of generation of the control signals. Data item representations are sensed by a data sensing device 63 and resultant signals are passed to an AND gating arrangement 64. This arrangement combines the control signals from the generator 61 with the signals from the sensing device 63 so that a signal is passed to an output signal generator 65 only if both control signals and data representing signals are present at the same time. This has the effect of varying the timing of the signals applied by the data item representation sensing device 63 to the output signal generator 65.

Output signals from the generator 65 are then applied to a utilization device 67 through a decoding arrangement 66. It will be appreciated that the decoding arrangement 66 may be omitted in apparatus in which the data representations are not sensed in coded form, or that if decoding is required the decoding arrangement may be connected at an earlier point in the chain, for example, directly to the sensing device 63.

FIGURE 6 shows an arrangement somewhat similar to that of FIGURE 5 in that the data item representing signals from the sensing device 63 and the control signals from the control signal generator 61 are gated in an AND gate arrangement 64 to provide timed data representing signals for application to an output signal generator 68. In this case, however, the timing of these signals is not varied according to the speed of the apparatus except in so far as the variation is inherent in the apparatus for the reason previously described. A transducer 69, again similar, for example, to the transducer 58 of FIGURE 4, is directly connected to the output signal generator 68, to provide the further timing variation. As in the previous case the output signals are applied to the utilization device 67 through a decoder 66 if necessary and, as before, it is to be understood that the decoder 66 may alternatively be connected in another position in the chain.

It will be appreciated that although the foregoing descriptions are applied to apparatus using perforations to represent data items other apparatus using different records and having alternative sensing devices may similarly employ means for varying the timing of output signals in the ways described. For example, the apparatus may use records in the form of sheets or tapes upon which data items are represented by marks and are optically sensed. Alternatively tape discs or drums having a magnetisable surface may be used to carry representations in the form of discrete areas having predetermined magnetic characteristics and such representations may be sensed by an appropriate reading head.

It will be seen, therefore, that the apparatus described consists essentially of means for sensing data item representations from a record and deriving output signals as the result of such sensing. An output signal is applied to a utilization device and although in the foregoing examples the utilization device is a sorter control mechanism, it will be seen that variation of the timing of the output signal in the manner described is advantageous for other utilization devices requiring a finite time for operation, such as printing and calculating devices, for example.

I claim:

1. Record sensing apparatus including a group of electrical sensing brushes effective to sense data representing perforations in a record; feeding means operable to feed a record past the sensing brushes; circuit breaker contacts connected to the sensing brushes and effective to determine the time delay after which an electrical signal is produced in response to the sensing of a perforation by one of said brushes; and circuit breaker operating means responsive to the speed of operation of the feeding means and effective to cause an additional increase in the time delay consequent upon a decrease in said operating speed.

2. Record sensing apparatus including means for sensing data representations on a record to generate corresponding electrical signals; means for feeding the record past the sensing means; an electrical signal delay unit responsive to each of said electrical signals to produce a corresponding output signal; and a centrifugal switch responsive to the speed of operation of the feeding means and operative to control the signal delay unit to provide different delay times for said output signal for different operating speeds.

3. Record sensing apparatus including means for sensing data representations on a record to produce corresponding electrical data representing signals; means for feeding the record past the sensing means; means operable to generate a train of timing signals substantially in synchronism with the operation of the feeding means; means responsive to the speed of operation of the feeding means and effective to delay the timing signals by an amount dependent upon said speed; and AND gating means controlled jointly by the data signals and the delayed timing signals.

4. Record sensing apparatus including means operative to sense data representations on a record to produce electrical data representing signals; means for feeding the record past the sensing means; a differentiating circuit operable by the data representing signals to produce a pair of time-spaced pulses of opposite polarity for each such signal; a two position switching circuit operable to select one pulse of said pair in one position and to select the other pulse of said pair in the other position; and control means coupled to the feeding means and responsive to the speed of operation thereof to determine the position of said switching circuit.

5. Record sensing apparatus including means for sensing data representations on a record to produce corresponding electrical data-representing signals; means for feeding the record past the sensing means; and signal handling means including an AND gate responsive to the data-representing signals, a signal delay unit operable by output signals from the AND gate and responsive to the speed of operation of the feeding means, and means for generating and applying to the AND gate a train of timing signals synchronous with the operation of the feeding means, the said output signal being delayed an increasing amount relative to the corresponding data representing signal consequent upon a decrease in the speed of operation of the feeding means.

References Cited by the Examiner

UNITED STATES PATENTS

| | | | |
|---|---|---|---|
| 1,741,985 | 12/1929 | Ford | 235—61.6 |
| 2,987,249 | 6/1961 | Van Vechten | 235—61.11 |

MALCOLM A. MORRISON, *Primary Examiner.*

CORNELIUS D. ANGEL, DARYL W. COOK,
*Examiners.*